US010963021B2

(12) United States Patent
Chang et al.

(10) Patent No.: US 10,963,021 B2
(45) Date of Patent: Mar. 30, 2021

(54) ELECTRONIC DEVICE AND ASSEMBLING METHOD OF ELECTRONIC DEVICE

(71) Applicants: Chin-Hsien Chang, Taipei (TW); Yen-Chia Chang, Taipei (TW)

(72) Inventors: Chin-Hsien Chang, Taipei (TW); Yen-Chia Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 6 days.

(21) Appl. No.: 16/453,997

(22) Filed: Jun. 26, 2019

(65) Prior Publication Data

US 2020/0012315 A1   Jan. 9, 2020

Related U.S. Application Data

(60) Provisional application No. 62/693,896, filed on Jul. 3, 2018.

(51) Int. Cl.
  *G06F 1/16*   (2006.01)
  *G06F 3/16*   (2006.01)
  *G06F 3/041*  (2006.01)

(52) U.S. Cl.
  CPC .............. *G06F 1/169* (2013.01); *G06F 3/041* (2013.01); *G06F 3/16* (2013.01)

(58) Field of Classification Search
  CPC .......... G06F 1/16; G06F 1/169; G06F 1/1662; G06F 1/1616; G06F 1/1656; H05K 5/02; H05K 5/0217; H05K 7/16
  USPC .............................. 361/679.08–9, 679.22–29
  See application file for complete search history.

(56) References Cited

U.S. PATENT DOCUMENTS

| | | | | |
|---|---|---|---|---|
| 7,963,709 B2 * | 6/2011 | Watanabe | ............. | G06F 1/1688 400/472 |
| 9,030,839 B2 * | 5/2015 | Leggett | .................... | H01H 9/02 361/781 |
| 9,912,792 B2 * | 3/2018 | Hahn | .................... | H04B 1/3888 |
| 2006/0077630 A1 * | 4/2006 | Minaguchi | ............ | G06F 1/1616 361/679.09 |
| 2007/0025071 A1 * | 2/2007 | Yokote | .................. | G06F 1/1656 361/679.08 |
| 2008/0094232 A1 * | 4/2008 | Yokote | .................. | G06F 1/1662 340/604 |
| 2013/0057776 A1 * | 3/2013 | Yamaguchi | ........... | G06F 1/1656 348/731 |
| 2013/0176671 A1 * | 7/2013 | Saito | ....................... | G06F 1/169 361/679.09 |
| 2013/0229758 A1 * | 9/2013 | Belesiu | ..................... | E05F 5/08 361/679.08 |

(Continued)

*Primary Examiner* — Tuan T Dinh
(74) *Attorney, Agent, or Firm* — JCIPRNET

(57) ABSTRACT

An electronic device includes a first body, a second body, a touch pad module and a speaker module. The first body has an assembling region. The second body is pivoted to the first body. The touch pad module and the speaker module are disposed in the assembling region, wherein the touch pad module includes a first extending circuit board which is configured with a conductive pad. The speaker module is located at one side of the touch pad module. The speaker module includes a speaker and a conductive elastic component, and the conductive elastic component contacts the conductive pad. An assembling method of an electronic device is also provided.

10 Claims, 5 Drawing Sheets

(56) References Cited

U.S. PATENT DOCUMENTS

| | | | | |
|---|---|---|---|---|
| 2013/0258572 A1* | 10/2013 | Hoshi | ............... | G06F 1/1662 |
| | | | | 361/679.08 |
| 2013/0328785 A1* | 12/2013 | Brooks | ............... | G06F 1/1662 |
| | | | | 345/170 |
| 2014/0111914 A1* | 4/2014 | Leggett | ............... | H01H 9/02 |
| | | | | 361/679.1 |

* cited by examiner

ELECTRONIC DEVICE AND ASSEMBLING METHOD OF ELECTRONIC DEVICE

CROSS REFERENCE TO RELATED APPLICATION

This application claims the priority benefit of U.S. provisional application Ser. No. 62/693,896, filed on Jul. 3, 2018. The entirety of the above-mentioned patent application is hereby incorporated by reference herein and made a part of specification.

BACKGROUND

Technical Field

The present disclosure relates to an electronic device, and more particularly to an electronic device and an assembling method of an electronic device.

Description of Related Art

A common electronic device, such as a notebook computer, includes a first body and a second body, wherein the first body can include a keyboard, a touch pad module, and a speaker module, and the second body can be a display. Specifically, considering the position of the user when operating the notebook computer, the touch pad module and the speaker module are mostly disposed at the same side of the keyboard, and the touch pad module and the speaker module are located closer to the user. Therefore, the configuration of the touch pad module is more user-friendly, and the configuration of the speaker module allows the user to obtain a more complete and direct listening experience.

In general, the number of speaker modules is two and are respectively disposed at two opposite sides of the touch pad module. The two speaker modules are electrically connected to each other through a first wire, and one of the two speaker modules is electrically connected to the motherboard through a second wire. On the other hand, the touch pad module is provided with a flexible circuit board, and the flexible circuit board is electrically connected to the motherboard. That is, the electrical connection structures (such as the first wire and the second wire) of the two speaker modules are not integrated with the electrical connection structure (such as the flexible circuit board) of the touch pad module, thus not only the assembling procedure of the speaker module and the touch pad module is time consuming, and it is easy to cause problems such as poor product yield or reliability.

SUMMARY

The disclosure provides an electronic device with excellent integration.

The present disclosure provides an assembling method of an electronic device, which helps to reduce assembling time and improve product yield and reliability.

The electronic device of the present disclosure includes a first body, a second body, a touch pad module and a speaker module. The first body has an assembling region. The second body is pivoted to the first body. The touch pad module is disposed in the assembling region, wherein the touch pad module includes a first extending circuit board, and the first extending circuit board is provided with a conductive pad. The speaker module is disposed in the assembling region and is located on one side of the touch pad module. The speaker module includes a speaker and a conductive elastic component, and the conductive elastic component contacts the conductive pad.

In an embodiment of the disclosure, the touch pad module includes keys and a main circuit board overlapping each other, and the first extending circuit board is connected to the main circuit board and extends outward from one side of the key.

In an embodiment of the disclosure, the main circuit board and the first extending circuit board are an integrally formed flexible circuit board.

In an embodiment of the disclosure, the touch pad module further includes a carrier, and the key and the main circuit board are disposed on the carrier. The main circuit board is located between the key and the carrier, and the conductive pad of the first extending circuit board is located outside the carrier.

In an embodiment of the disclosure, the electronic device further includes a motherboard disposed in the assembling region. The touch pad module further includes a second extending circuit board, and the second extending circuit board is connected to the main circuit board. The second extending circuit board extends toward the motherboard and is electrically connected to the motherboard.

In an embodiment of the disclosure, the main circuit board, the first extending circuit board and the second extending circuit board are an integrally formed flexible circuit board.

In an embodiment of the disclosure, the first extending circuit board and the second extending circuit board are not parallel to each other.

In an embodiment of the disclosure, the number of the speaker modules is two, and the two speaker modules are respectively located at two opposite sides of the touch pad module. The number of the first extending circuit board is two, and the two first extending circuit boards extend toward the two speaker modules respectively.

The assembling method of an electronic device of the present disclosure includes the following steps. First, the body is provided, and the body has an assembling region. Next, the touch pad module is assembled into the assembling region, wherein the touch pad module includes a first extending circuit board, and the first extending circuit board is provided with a conductive pad. Thereafter, a speaker module is provided, wherein the speaker module includes a speaker and a conductive elastic component, the conductive elastic component is aligned with the conductive pad, and the speaker module is assembled into the assembling region, so that the conductive elastic component contacts the conductive pad.

In an embodiment of the disclosure, the assembling method of the electronic device further includes the following steps. Before contacting the conductive elastic component with the conductive pad, the first extending circuit board is positioned in the assembling region.

Based on the above, the electronic device of the present disclosure has an integrated electrical connection structure, and the integrated electrical connection structure is applied to the speaker module and the touch pad module. Therefore, the electronic device of the present disclosure has excellent integration. On the other hand, after the speaker module is assembled into the assembling region of the first body, the conductive elastic component of the speaker module contacts the conductive pad of the first extending circuit board of the touch pad module, so that the speaker module is electrically connected to the first extending circuit board. Therefore, the assembling method of the electronic device proposed by the present disclosure not only helps to reduce assembling time, but also improves product yield and reliability.

In order to make the aforementioned features and advantages of the disclosure more comprehensible, embodiments accompanying figures are described in detail below.

DESCRIPTION OF THE EMBODIMENTS

Figure 1:
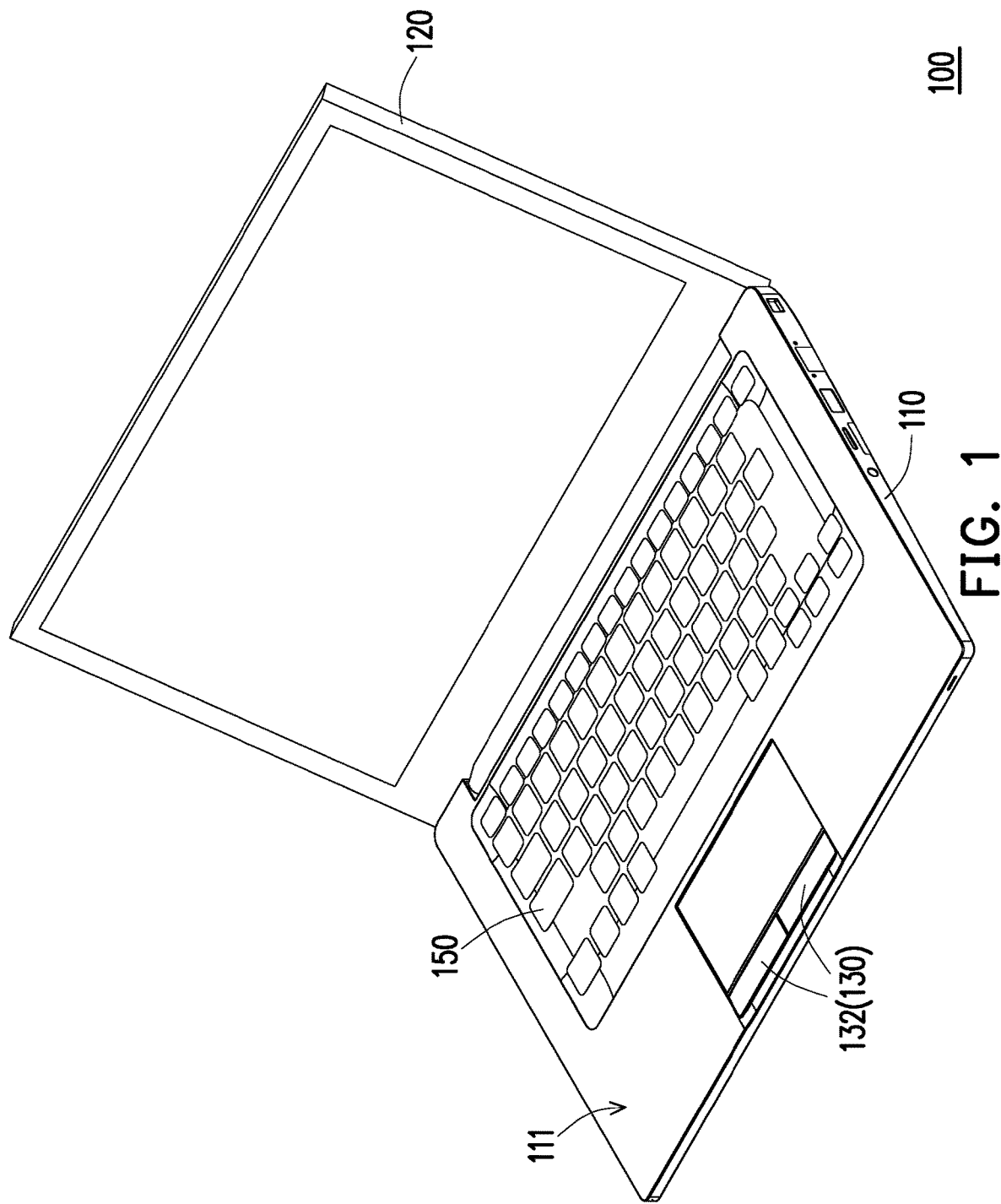
FIG. 1 is a schematic view of an electronic device according to an embodiment of the disclosure.
Figure 2:
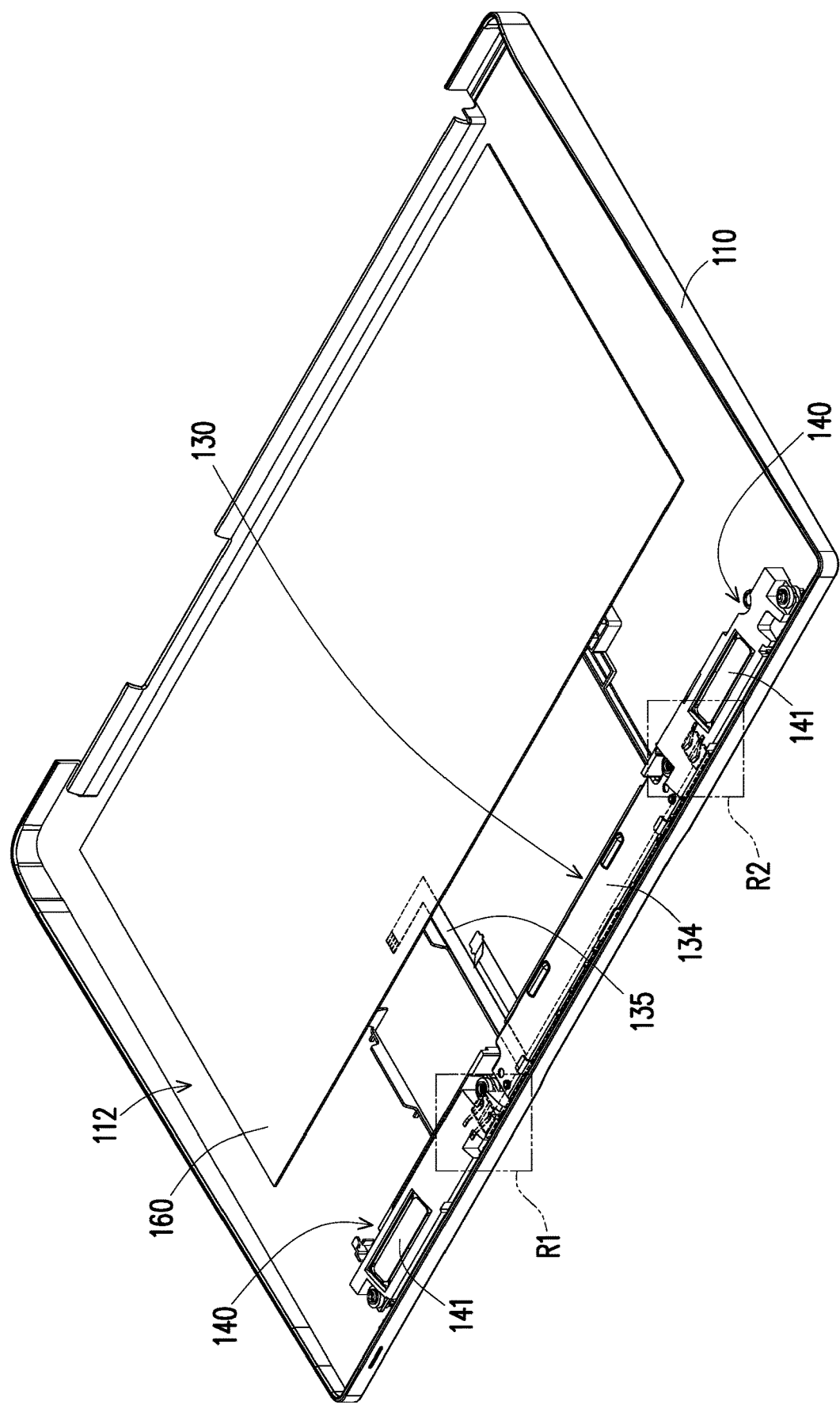
FIG. 2 is a schematic view showing the internal structure of the first body of FIG. 1.

FIG. 1 is a schematic view of an electronic device according to an embodiment of the disclosure. FIG. 2 is a schematic view showing the internal structure of the first body of FIG. 1. Referring to FIG. 1 and FIG. 2, in the embodiment, an electronic device 100 can be a notebook computer, and includes a first body 110 and a second body 120, and the second body 120 is pivoted to the first body 110. The first body 110 can be a host having functions of arithmetic processing, input operation, power transmission, and signal transmission, and the second body 120 can be a display. Specifically, the electronic device 100 further includes a touch pad module 130, a speaker module 140, and a keyboard 150. The touch pad module 130, the speaker module 140, and the keyboard 150 are disposed at the first body 110, and at least a portion of the touch pad module 130 and at least a portion of the keyboard 150 are exposed from an input operation surface 111 of the first body 110 for user to operate. On the other hand, the first body 110 has an assembling region 112 facing away from the input operation surface 111, that is, the inside of the first body 110. The touch pad module 130 and the speaker module 140 are disposed in the assembling region 112 of the first body 110, and the speaker module 140 is located at one side of the touch pad module 130.

Figure 3A:
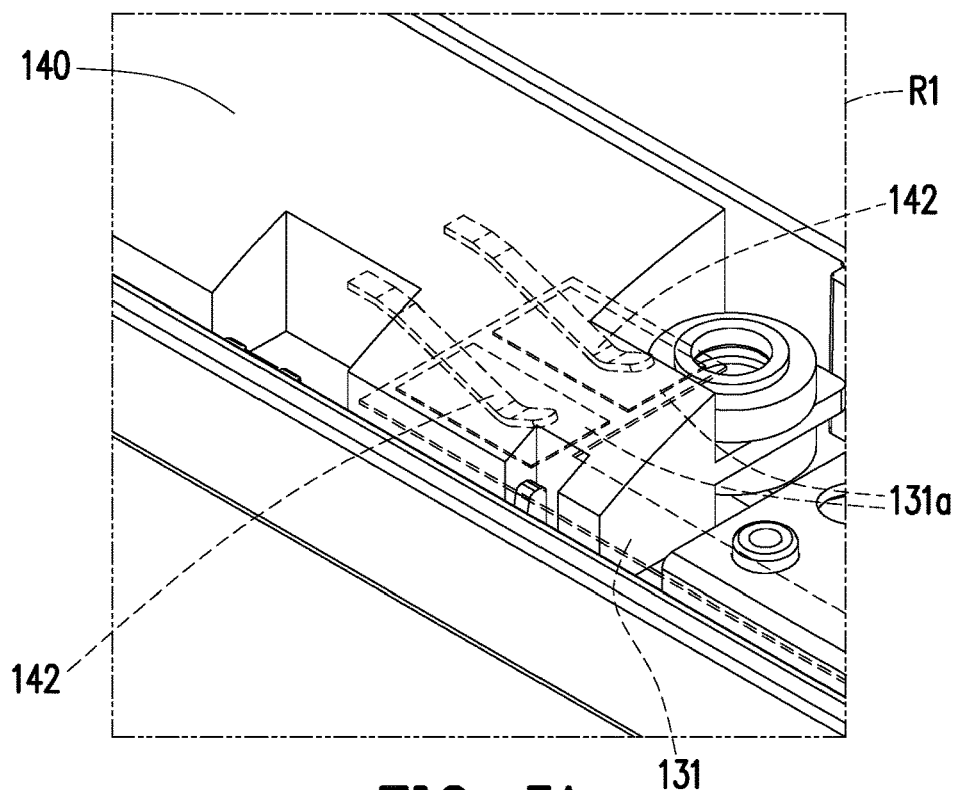
FIG. 3A and FIG. 3B are enlarged schematic views of regions R1 and R2 of FIG. 2.
Figure 3B:
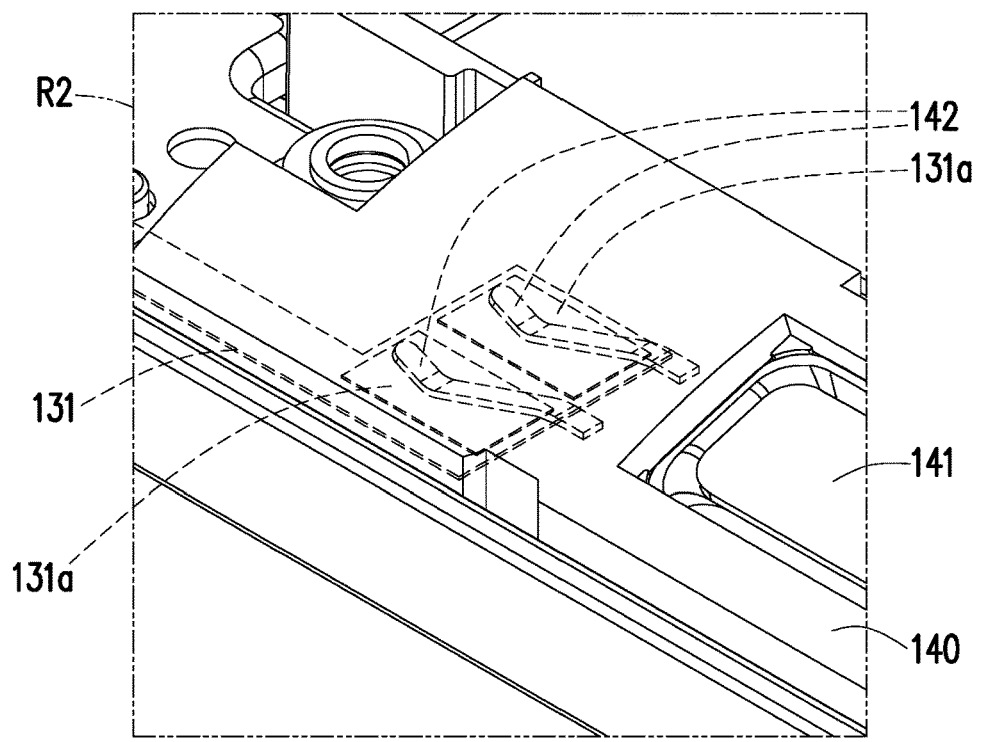
Figure 4:
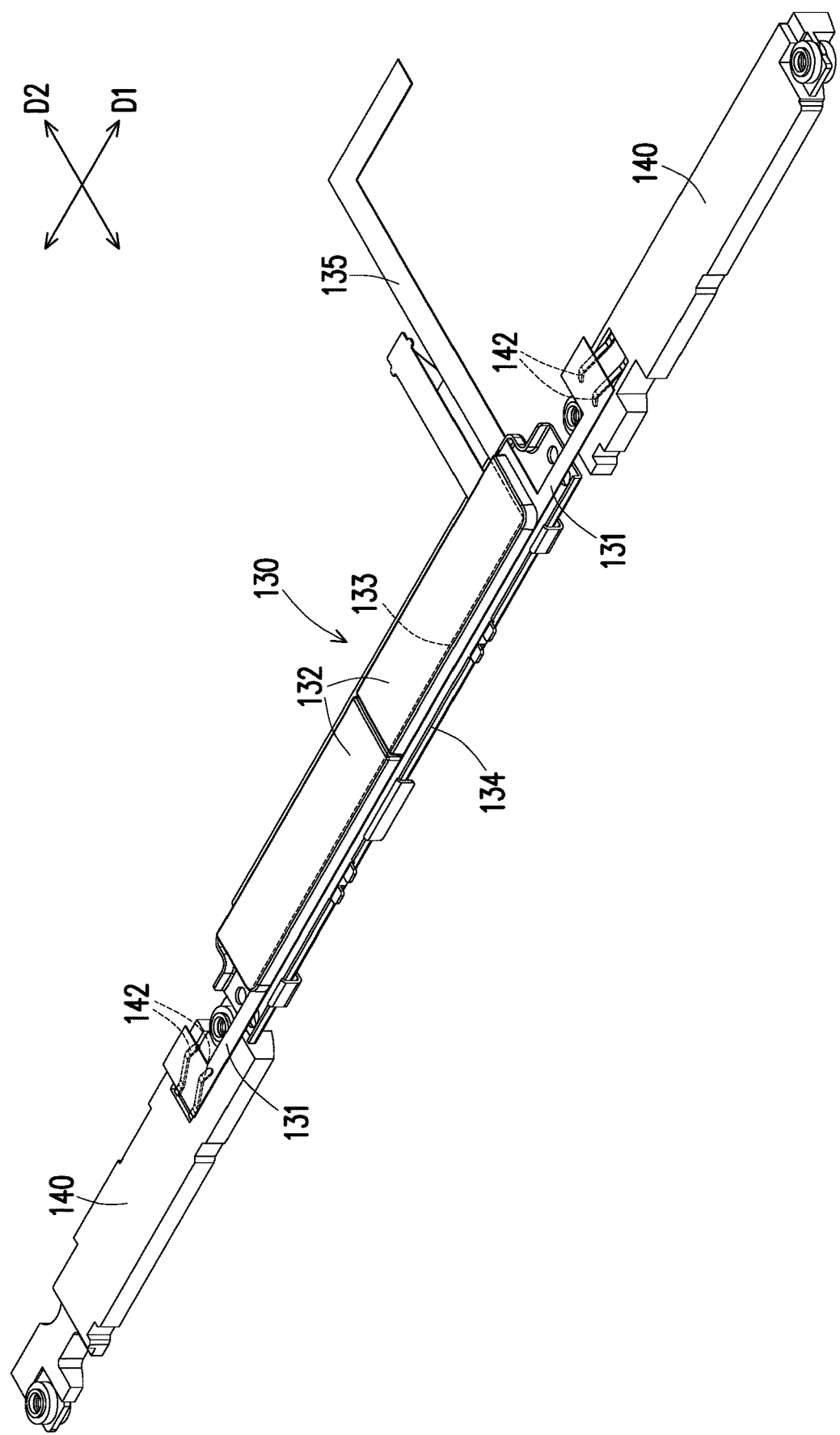
FIG. 4 is a schematic view of the touch pad module and the speaker module of FIG. 2 in another viewing angle.

FIG. 3A and FIG. 3B are enlarged schematic views of regions R1 and R2 of FIG. 2. FIG. 4 is a schematic view of the touch pad module and the speaker module of FIG. 2 in another viewing angle. Referring to FIG. 1, FIG. 2, FIG. 3A, FIG. 3B and FIG. 4, in the embodiment, the electronic device 100 has an integrated electrical connection structure, and the integrated electrical connection structure is applied to the speaker module 140 and the touch pad module 130. For example, the touch pad module 130 includes a first extending circuit board 131, and the first extending circuit board 131 is provided with a conductive pad 131a. On the other hand, the speaker module 140 includes a speaker 141 and a conductive elastic component 142, and the conductive elastic component 142 contacts the conductive pad 131a. The speaker module 140 can be electrically connected to the first extending circuit board 131 based on the contact of the conductive elastic component 142 and the conductive pad 131a. Therefore, the electronic device 100 has excellent integration.

For example, the electronic device 100 is provided with two speaker modules 140, wherein the two speaker modules 140 are respectively located at two opposite sides of the touch pad module 130. Correspondingly, the number of the first extending circuit board 131 is also two, wherein the two first extending circuit boards 131 respectively extend toward the two speaker modules 140, and the conductive elastic component 142 of each of the speaker modules 140 contacts the conductive pad 131a of the corresponding first extending circuit board 13, such that each of the speaker modules 140 is electrically connected to the corresponding first extending circuit board 131. In other embodiments, the number of sets of the speaker module and the first extending circuit board may be one set, that is, the number of the speaker modules and the number of the first extending circuit boards are one respectively.

In this embodiment, the touch pad module 130 includes a key 132 and a main circuit board 133 overlapping each other, wherein the two first extending circuit boards 131 are connected to the main circuit board 133 and extend outward from two opposite sides of the button key, respectively. Further, the main circuit board 133 and the two first extending circuit boards 131 may be an integrally formed flexible circuit board. Along a first direction D1, the two first extending circuit boards 131 are respectively extended from the two opposite sides of the main circuit board 133 toward the two speaker modules 140. In other embodiments, the number of sets of the speaker module and the first extending circuit board may be one set, that is, the number of the speaker modules and the number of the first extending circuit boards are one respectively. The first extending circuit board is connected to one side of the main circuit board and extends outward from one side of the key.

Referring to FIG. 1, FIG. 2 and FIG. 4, in the embodiment, the touch pad module 130 further includes a carrier 134, wherein the key 132 and the main circuit board 133 are disposed on the carrier 134, and the main circuit board 133 is located between the key 132 and the carrier 134. The main circuit board 133 is positioned between the key 132 and the carrier 134, and thus the main circuit board 133 would not be easily detached from the carrier 134. On the other hand, the conductive pad 131a of each of the first extending circuit boards 131 is located outside the carrier 134 to avoid that the assembling and positioning of each of the speaker modules 140 and the conductive pad 131a of the corresponding first extending circuit board 131 is obstructed.

The electronic device 100 further includes a motherboard 160 disposed in the assembling region 112. The touch pad module 130 further includes a second extending circuit board 135, and the second extending circuit board 135 is connected to the main circuit board 133. Further, the main circuit board 133, the two first extending circuit boards 131 and the second extending circuit board 135 may be an integrally formed flexible circuit board, and the second extending circuit board 135 is extended toward the motherboard 160 along a second direction D2 perpendicular to the first direction D1 and is electrically connected to the motherboard 160. Therefore, each of the speaker modules 140 can be electrically connected to the motherboard 160 through the corresponding first extending circuit board 131, the main circuit board 133, and the second extending circuit board 135. In other embodiments, the extending direction of the two first extending circuit boards and the extending direction of the second extending circuit board may not be parallel to each other, but are not perpendicularly intersected.

Figure 5:
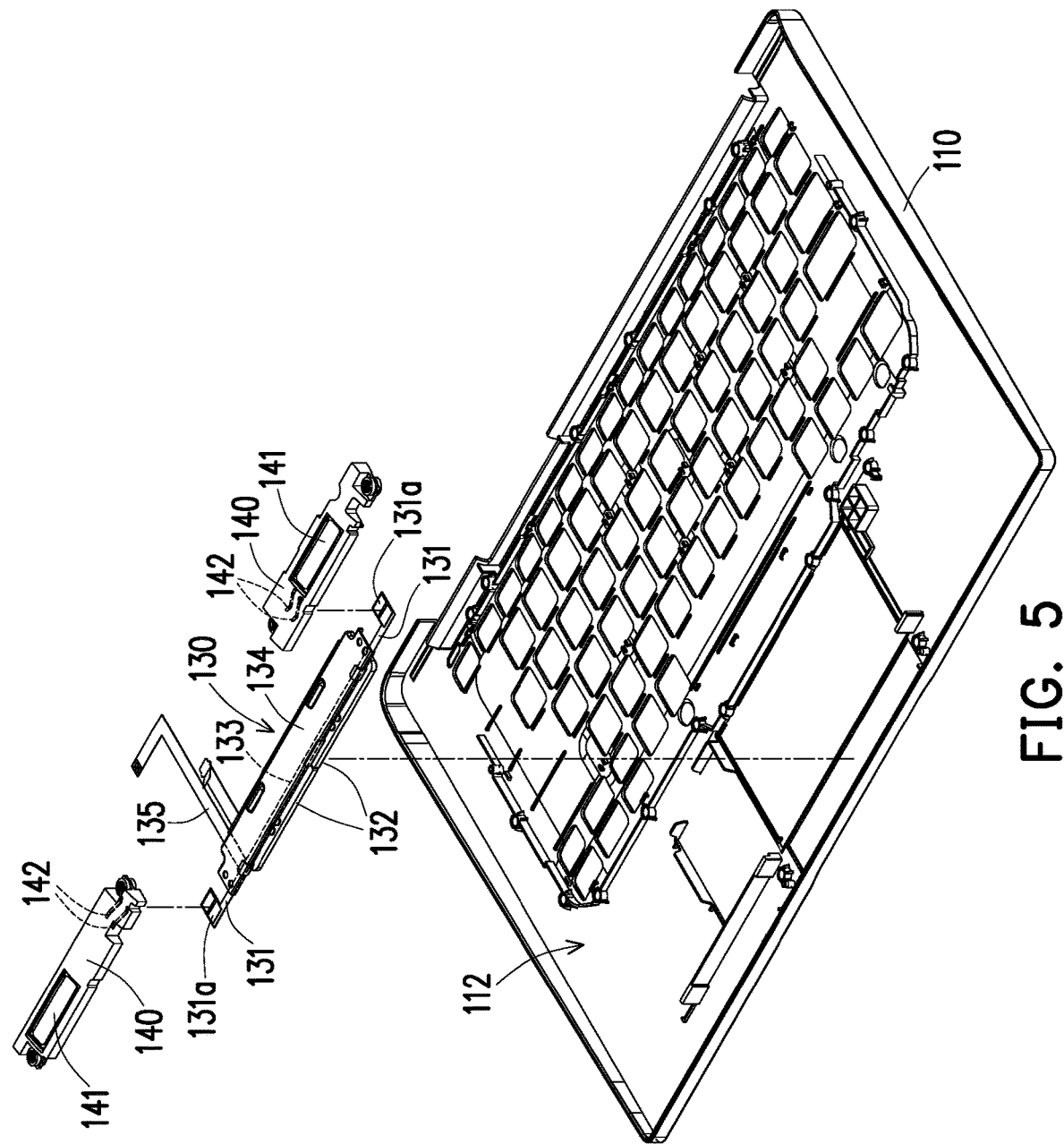
FIG. 5 is a schematic view showing disassembling the first body, the touch pad module, and the speaker module of FIG. 2.

FIG. 5 is a schematic view showing disassembling the first body, the touch pad module, and the speaker module of FIG. 2. The following describes the assembling method of the electronic device 100, and specifically describes the assembling method of the first body 110, the touch pad module 130, and the two speaker modules 140. Referring to FIG. 2, FIG. 4 and FIG. 5, first, the first body 110 is provided, and the assembling region 112 of the first body 110 faces upward. Then, the touch pad module 130 is assembled into the assembling region 112, and the carrier 134 of the touch pad module 130 can be positioned in the assembling region 112 by means of screwing, locking or engaging to avoid that the key 132 and the main circuit board 133 on the carrier 134 are deviated. Then, the two first extending circuit boards 131 are positioned in the assembling region 112, and the conductive pad 131a of each of the first extending circuit boards 131 faces upward to facilitate the subsequent assembling of the two speaker modules 140. Specifically, the installer can position the two first extending circuit boards 131 in the assembling region 112 through an adhesive according to the predetermined assembling position of the two speaker modules 140, thereby preventing the first extending circuit board 131 from being deviated.

Thereafter, the conductive elastic component 142 of each of the speaker modules 140 is aligned with the conductive pad 131a of the corresponding first extending circuit board 131, and each of the speaker modules 140 is assembled into the assembling region 112 so that the conductive elastic component 142 of each of the speaker modules 140 contacts the conductive pad 131a of the corresponding first extending circuit board 131, as shown in FIG. 3A and FIG. 3B. For example, each of the speaker modules 140 can be positioned in the assembling region 112 by means of screwing, locking or engaging and so on to prevent the conductive elastic component 142 from being deviated relative to the conductive pad 131a of the corresponding first extending circuit board 131.

After the conductive elastic component 142 of each of the speaker modules 140 is in contact with the conductive pad 131a of the corresponding first extending circuit board 131, each of the speaker modules 140 can be electrically connected to the motherboard 160 through the corresponding first extending circuit board 131, the main circuit board 133 and the second extending circuit board 135. Therefore, the assembling method of the electronic device 100, specifically the assembling method of the first body 110, the touch pad module 130, and the two speaker modules 140 not only helps to reduce assembling time, but also improves product yield and reliability In summary, the electronic device of the present disclosure has an integrated electrical connection structure, and the integrated electrical connection structure is applied to the speaker module and the touch pad module. Therefore, the electronic device of the present disclosure has excellent integration. On the other hand, after the speaker module is assembled into the assembling region of the first body, the conductive elastic component of the speaker module contacts the conductive pad of the first extending circuit board of the touch pad module, so that the speaker module is electrically connected to the first extending circuit board. Further, the first extending circuit board, the main circuit board, and the second extending circuit board are an integrally formed flexible circuit board, and the second extending circuit board is electrically connected to the motherboard. After the conductive elastic component of the speaker module contacts the conductive pad of the first extending circuit board of the touch pad module, the speaker module can be electrically connected to the motherboard through the first extending circuit board, the main circuit board, and the second extending circuit board. Therefore, the assembling method of the electronic device proposed by the present disclosure not only helps to reduce assembling time, but also improves product yield and reliability.

Although the present disclosure has been disclosed in the above embodiments, it is not intended to limit the present disclosure, and those skilled in the art can make some modifications and refinements without departing from the spirit and scope of the disclosure. Therefore, the scope to be protected by the present disclosure is subject to the scope defined by the appended claims.

What is claimed is:

1. An electronic device, comprising:
   a first body, having an assembling region;
   a second body, pivoted to the first body;
   a touch pad module, disposed in the assembling region, wherein the touch pad module comprises a first extending circuit board, and the first extending circuit board is provided with a conductive pad; and
   a speaker module, disposed in the assembling region and is located at one side of the touch pad module, wherein the speaker module comprises a speaker and a conductive elastic component, and the conductive elastic component contacts the conductive pad.

2. The electronic device of claim 1, wherein the touch pad module comprises a key and a main circuit board overlapping each other, the first extending circuit board is connected to the main circuit board and extends outward from one side of the key.

3. The electronic device of claim 2, wherein the main circuit board and the first extending circuit board are an integrally formed flexible circuit board.

4. The electronic device of claim 2, wherein the touch pad module further comprises a carrier, and the key and the main circuit board are disposed on the carrier, the main circuit board is located between the key and the carrier, and the conductive pad of the first extending circuit board is located outside the carrier.

5. The electronic device of claim 2, further comprising:
   a motherboard, disposed in the assembling region, wherein the touch pad module further comprises a second extending circuit board, and the second extending circuit board is connected to the main circuit board, the second extending circuit board extends toward the motherboard and is electrically connected to the motherboard.

6. The electronic device of claim 5, wherein the main circuit board, the first extending circuit board, and the second extending circuit board are an integrally formed flexible circuit board.

7. The electronic device of claim 5, wherein the first extending circuit board and the second extending circuit board are not parallel to each other.

8. The electronic device of claim 1, wherein the number of the speaker modules is two, and the two speaker modules are respectively located at two opposite sides of the touch pad module, the number of the first extending circuit board is two, and the two first extending circuit boards extend toward the two speaker modules respectively.

9. An assembling method of an electronic device, comprising:
   providing a body, and the body having an assembling region;
   assembling the touch pad module into the assembling region, wherein the touch pad module comprises a first extending circuit board, and the first extending circuit board is provided with a conductive pad; and providing a speaker module, wherein the speaker module comprises a speaker and a conductive elastic component, the conductive elastic component is aligned with the conductive pad, and the speaker module is assembled into the assembling region, so that the conductive elastic component contacts the conductive pad.

10. The assembling method of electronic device of claim 9, further comprising:
positioning the first extending circuit board in the assembling region before contacting the conductive elastic component with the conductive pad.

* * * * *